(12) United States Patent
Eck et al.

(10) Patent No.: US 8,977,374 B1
(45) Date of Patent: Mar. 10, 2015

(54) GEOMETRIC AND ACOUSTIC JOINT LEARNING

(75) Inventors: Douglas Eck, Palo Alto, CA (US); Jay Yagnik, Mountain View, CA (US)

(73) Assignee: Google Inc., Mountain View, CA (US)

(*) Notice: Subject to any disclaimer, the term of this patent is extended or adjusted under 35 U.S.C. 154(b) by 282 days.

(21) Appl. No.: 13/610,866

(22) Filed: Sep. 12, 2012

(51) Int. Cl.
| | | |
|---|---|---|
| *G06F 17/00* | (2006.01) | |
| *G06F 17/30* | (2006.01) | |
| *G06F 7/00* | (2006.01) | |
| *G06G 7/12* | (2006.01) | |
| *H04H 60/65* | (2008.01) | |
| *H04H 60/58* | (2008.01) | |
| *G11B 27/30* | (2006.01) | |
| *H04H 60/37* | (2008.01) | |
| *H04H 60/47* | (2008.01) | |
| *H04H 60/48* | (2008.01) | |

(52) U.S. Cl.
CPC ............. *H04H 60/65* (2013.01); *H04H 60/58* (2013.01); *G11B 27/3009* (2013.01); *H04H 60/37* (2013.01); *H04H 60/47* (2013.01); *H04H 60/48* (2013.01)
USPC ............. 700/94; 708/814; 708/815; 707/749

(58) Field of Classification Search
CPC . G10L 19/06; G10L 19/07; G10L 2019/0001; G11B 27/11; G11B 27/3009; H04H 60/35; H04H 60/37; H04H 60/47; H04H 60/48; H04H 60/58; H04H 60/65
USPC .................... 700/94; 708/809, 814, 815, 441; 707/737, 741, 749
See application file for complete search history.

(56) References Cited

U.S. PATENT DOCUMENTS

| | | | | |
|---|---|---|---|---|
| 5,210,820 | A * | 5/1993 | Kenyon | 704/200 |
| 2009/0306797 | A1 * | 12/2009 | Cox et al. | 700/94 |
| 2010/0185713 | A1 * | 7/2010 | Aoki et al. | 707/912 |

OTHER PUBLICATIONS

Cano, et al. "A Review of Audio Fingerprinting", 2005, Journal of VLSI Signal Processing 41, pp. 271-284.*

* cited by examiner

*Primary Examiner* — Jesse Elbin
(74) *Attorney, Agent, or Firm* — Lowenstein Sandler LLP (57) ABSTRACT

Described herein are methods and system for analyzing music audio. An example method includes obtaining a music audio track, calculating acoustic features of the music audio track, calculating geometric features of the music audio track in view of the acoustic features, and determining a mood of the music audio track in view of the geometric features.

39 Claims, 9 Drawing Sheets

GEOMETRIC AND ACOUSTIC JOINT LEARNING

BACKGROUND

The content of music audio can vary widely. For example, different pieces of music might include different melodies, rhythms, instruments, tempos, and so forth.

SUMMARY

In general, one implementation of the subject matter disclosed herein is directed to a music-analysis tool. The music-analysis tool includes a music audio track selection module that is configured to select at least one music audio track from a corpus of music audio tracks. The music-analysis tool also includes an acoustic-features module that is configured to calculate acoustic features of the music audio track and a vector-quantization module that is configured to vector quantize the calculated acoustic features.

The music-analysis tool includes a geometric-features module that is configured to calculate geometric features of the music audio track based on the vector-quantized acoustic features. The vector-quantization module is further configured to vector quantize the calculated geometric features.

The music-analysis tool also includes a geometric-features module that is configured to calculate geometric features of the music audio track based on the vector-quantized acoustic features. The vector-quantization module is further configured to vector quantize the calculated geometric features.

The music-analysis tool also includes a cross-product module that is configured to take a cross-product of the vector-quantized acoustic features and the vector-quantized geometric features to yield a joint acoustic-geometric feature vector for the music audio track. The music-analysis tool includes a playlist-selection module that is configured to select a playlist of music audio based on the joint acoustic-geometric feature vector for the music audio track.

This Summary is submitted with the understanding that it will not be used to interpret or limit the scope or meaning of the claims. This Summary is not intended to identify key features or essential features of the claimed subject matter, nor is it intended to be used as an aid in determining the scope of the claimed subject matter.

BRIEF DESCRIPTION OF THE DRAWINGS

The Detailed Description references the accompanying figures. In the figures, the left-most digit(s) of a reference number identifies the figure in which the reference number first appears. The same numbers are used throughout the drawings to reference like features and components.

DETAILED DESCRIPTION

The technology described herein includes a tool for analyzing music audio. A music-analysis tool implements geometric and acoustic joint learning to analyze music audio tracks. The resulting analysis is used in concert with machine learning to generate playlists of music, predict musical artists, determine a mood of music audio, generate new music compositions, and the like.

In one or more implementations described herein, the music-analysis tool obtains at least one music audio track from a collection of music audio tracks.

For each music track the music-analysis tool calculates acoustic features of the music audio track using an audio spectrogram, a Stabilized Auditory Image (SAI), and/or mel-frequency cepstrum coefficients (MFCCs). Acoustic features include how instruments sound, i.e., does it sound like a kazoo, does it sound like a snare drum, does it sound like a trombone, etc. The acoustic features thus relate to timbre, pitch, etc.

Other acoustic features include Linear Predictor Coefficients (LPC) and/or Linear Predictive Coding of the music audio track. LPCs represent the signal envelope of the spectral signal for the music audio track.

Still other acoustic features include the Line Spectral Frequency (LSF) and/or Line Spectral Pairs (LSP) for the music audio track. Line Spectral Frequencies and/or Line Spectral Pairs represent the Linear Predictor Coefficients of the music audio track.

The audio spectrogram, SAI, and/or MFCCs each includes a set of clusters of interest points in the acoustic features. Each cluster includes a centroid. The centroids form a code.

For each music track the music-analysis tool calculates local features of the music audio track using an audio spectrogram, a Stabilized Auditory Image (SAI), and/or mel-frequency cepstrum coefficients (MFCCs). The audio spectrogram, SAI, and/or MFCCs each includes a set of clusters of interest points in the local features. Each cluster includes a centroid. The centroids form a code.

For each music track the music-analysis tool calculates short timescale features of the music audio track using an audio spectrogram, a Stabilized Auditory Image (SAI), and/or mel-frequency cepstrum coefficients (MFCCs). The audio spectrogram, SAI, and/or MFCCs each includes a set of clusters of interest points in the short timescale features. Each cluster includes a centroid. The centroids form a code.

In one or more implementations described herein, the music-analysis tool vector quantizes the calculated acoustic features, local features, and/or short timescale features by mapping the codes into a codebook. For example, the music-analysis tool applies a winner-take-all (WTA) hashing algorithm and/or a k-means algorithm to the calculated acoustic features to vector quantize the calculated acoustic features. Vector quantizing the acoustic features, local features, and/or short timescale features maps the codes into a codebook.

In one or more implementations described herein, the music-analysis tool calculates geometric features of the music audio track. Geometric features relate to attributes such as "what was the melody in the music audio track" and/or "can the music audio track be segmented into a verse-chorus-refrain kind of structure." The geometric features thus relate to melody, chords, rhythm, zero crossing rate, etc. In one or more implementations, the music-analysis tool calculates geometric features of the music audio track based on the vector-quantized acoustic, local, and/or short timescale features (e.g., based on the codebook). The music-analysis tool then vector quantizes the geometric features.

In one or more implementations described herein, the music-analysis tool calculates regional features of the music audio track based on the vector-quantized acoustic, local, and/or short timescale features (e.g., based on the codebook). The music-analysis tool then vector quantizes the regional features.

In one or more implementations described herein, the music-analysis tool calculates long timescale features of the music audio track based on the vector-quantized acoustic, local, and/or short timescale features (e.g., based on the codebook). The music-analysis tool then vector quantizes the long timescale features.

For example, the music-analysis tool applies onset detection techniques to determine the beginning of a musical note in the music audio track. Alternatively, the music-analysis tool applies auto-correlation techniques to the auto-correlation to represent a relationship between clusters of data points in the acoustic features, local features, and/or short timescale features of the music audio track.

In one or more implementations described herein, the music-analysis tool takes a cross-product of the vector-quantized acoustic, local, and/or short timescale features and the vector-quantized and the geometric features, regional features, and/or long timescale features. That is, the music-analysis tool maps the codebook (for the vector-quantized acoustic features, local features, and/or short timescale features) onto the vector-quantized geometric, regional, and/or long timescale features.

Taking the cross-product of the vector-quantized acoustic features and the vector-quantized geometric features enables the music analysis tool to make determinations such as "the music audio track has a saxophone and the saxophone is playing this particular melody" or "there is a flute in this music audio track and it is playing with an underlying rhythm of a snare drum." In effect, the music analysis tool rejoins the vector-quantized audio features with the vector-quantized geometric features so that the musical content of the music audio track (e.g., instrumentation, timbre features, pitch, etc.) is combined with the structural content of the music audio track (e.g., rhythm, melody, etc.)

In one or more implementations, the music-analysis tool takes a Kronecker product, a Khatri-Rao product, and/or a Tracy-Singh product of the vector-quantized acoustic, local, and/or short timescale features and the vector-quantized and the geometric features, regional features, and/or long timescale features. The result includes joint acoustic-geometric features, joint regional-local features, and/or joint short-long timescale features for the music audio track.

In one or more implementations, the music-analysis tool uses the joint acoustic-geometric features, joint regional-local features, and/or joint short-long timescale features for the one or more music audio tracks, along with machine learning, to classify a music audio track that is to be subsequently analyzed, recommend other music similar to the music audio track that is to be subsequently analyzed, or the like.

Alternatively, the music-analysis tool uses the joint acoustic-geometric features, joint regional-local features, and/or joint short-long timescale features for the one or more music audio tracks, along with machine learning, to select a playlist for one or more music audio tracks that are subsequently analyzed by the music-analysis tool.

In an alternative implementation, the music-analysis tool uses the joint acoustic-geometric features, joint regional-local features, and/or joint short-long timescale features for the one or more music audio tracks, along with machine learning, to select an artist that is the same or similar to an artist on one or more music audio tracks that are subsequently analyzed by the music-analysis tool.

Alternatively still, the music-analysis tool uses the joint acoustic-geometric features, joint regional-local features, and/or joint short-long timescale features for the one or more music audio tracks, along with machine learning, to compose one or more unique music audio tracks that are different from one or more music audio tracks that are subsequently analyzed by the music-analysis tool.

For one or more implementations described herein, the machine learning may be a classification algorithm, a ranking algorithm, a prediction algorithm, or the like. Suitable machine learning techniques include a support vector machine (SVM) and/or a regression vector machine (RVM).

Example Music-Analysis Tool Using Geometric and Acoustic Joint Learning

Figure 1:
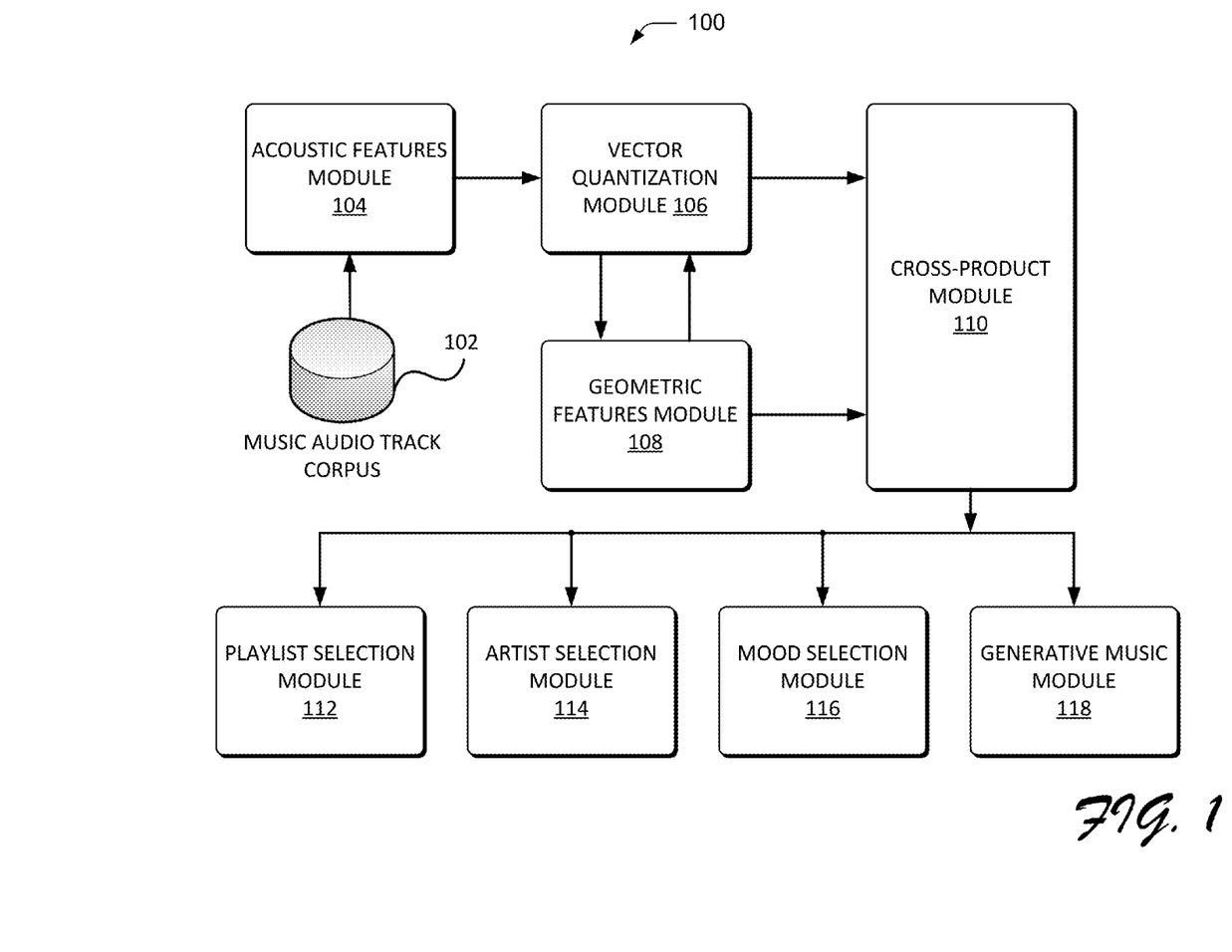
FIG. 1 illustrates an example music-analysis tool according to one or more implementations described herein.

FIG. 1 illustrates an example music-analysis tool 100 according to one or more implementations described herein. In the illustrated implementation, the music-analysis tool 100 includes a music audio track corpus 102, an acoustic features module 104, a vector quantization module 106, a geometric features module 108, and a cross-product module 110. The illustrated music-analysis tool 100 also includes a playlist selection module 112, an artist selection module 114, a mood selection module 116, and a generative music module 118.

In one or more implementations, the music audio track corpus 102 includes the music tracks of different genres, tempos, moods, etc. Music tracks in the corpus 102 include professional and/or amateur material. Such material includes scores from feature films, television show themes, audio from music videos, recorded songs, and the like.

The music tracks in the corpus 102 include one or more attributes and/or observations known as features. Example features include mel-frequency cepstral coefficients (MFCC), Stabilized Auditory Images (SATs), audio spectrograms, and the like. The features represent timbre, harmonies, instrumentation, rhythm, loudness, pitch, genre, artist, mood, tempo, beats, chords, and the like.

As an example, classical music has SAIs or other audio features that are different than audio features of rock music. The different audio features help to classify a music audio track as classical music, reggae, rock, bebop, and such. The different audio features also help to classify timbre, mood, etc., of a music audio track.

In one or more implementations, the acoustic features module 104 obtains one or more music audio tracks from the corpus 102 and calculates acoustic features of the music audio track for each music track obtained from the corpus 102. The acoustic features module 104 aggregates and/or concatenates the acoustic features into a single acoustic feature vector for each music audio track. For each music track the acoustic features module 104 utilizes an audio spectrogram, a Stabilized Auditory Image (SAI), and/or mel-frequency cepstrum coefficients (MFCCs) to calculate the acoustic features of the music audio track.

The audio spectrogram, SAI, and/or MFCCs each includes a set of clusters of interest points in the acoustic features. Each cluster includes a centroid. The centroids form a code.

In one or more implementations, the acoustic features module 104 utilizes one or more open source feature calculation toolkits to calculate features and to concatenate the features into the acoustic feature vector. Alternative implementations utilize one or more proprietary feature calculation toolkits. Feature calculation tools and/or techniques include Fourier-based feature calculation, wavelet-based feature calculation, histograms, audio spectrograms, etc. Entities suitable for implementing the acoustic features module 104 include MATLAB® by The MathWorks, Inc., SciLab® by INRIA, Python®-based toolkits by Python Software Foundation (PSF), Music Analysis, Retrieval and Synthesis for Audio Signals (Marsyas) C++ software by developed by George Tzanetakis, and the like.

In one or more implementations, the vector quantization module 106 vector quantizes the acoustic features calculated by the acoustic features module 104. Vector quantizing the acoustic features maps the codes in the audio spectrogram, SAI, and/or MFCCs into a codebook.

For example, the vector quantization module 106 calculates k-means for the acoustic features calculated by the acoustic features module 104 to map the codes in the audio spectrogram, SAI, and/or MFCCs into a codebook. Alternatively, the vector quantization module 106 applies a winner-take-all (WTA) hash to the acoustic features calculated by the acoustic features module 104 to map the codes in the audio spectrogram, SAI, and/or MFCCs into a codebook.

In one or more implementations, the geometric features module 108 calculates geometric features, regional features, and/or long timescale features of the music audio track based on the acoustic features that were vector-quantized by the vector quantization module 106 (e.g., based on the codebook). For example, the geometric features module 108 applies onset detection techniques to determine the beginning of a musical note in the music audio track. Alternatively, the geometric features module 108 applies auto-correlation techniques to determine a relationship between clusters of data points in the acoustic features of the music audio track. The vector quantization module 106 also vector quantizes the calculated geometric features In one or more implementations, the cross-product module 110 takes a cross-product of the vector-quantized acoustic features and the vector-quantized geometric features. That is, the cross-product module 110 maps the codebook (for the vector-quantized acoustic features) onto the vector-quantized geometric features. A result of the cross-product is a joint acoustic-geometric feature vector for each music audio track obtained from the corpus 102.

For example, the cross-product module 110 calculates a Kronecker product of the vector-quantized acoustic features and the vector-quantized geometric features. Alternatively, the cross-product module 110 takes a Khatri-Rao product, and/or a Tracy-Singh product of the vector-quantized acoustic features and the vector-quantized geometric features.

In one or more implementations, the playlist selection module 112 implements machine learning techniques and the joint acoustic-geometric feature vector generated by the cross-product module 110 to generate a playlist of one or more music audio tracks. The machine learning techniques may include a classification algorithm, a ranking algorithm, a prediction algorithm, or the like. Suitable machine learning techniques include a support vector machine (SVM) and/or a regression vector machine (RVM).

For example, suppose a music audio track includes Jimmy Page playing guitar on the song Stairway to Heaven©. Based on the joint acoustic-geometric feature vector the playlist selection module 112 uses machine learning to select music tracks that include one or more renditions of the song Stairway to Heaven. Alternatively, the playlist selection module 112 selects music tracks that include Jimmy Page on guitar.

In another example, suppose a music audio track includes Pat Metheny playing acoustic guitar. Based on the joint acoustic-geometric feature vector the playlist selection module 112 selects other music tracks that include Pat Metheny on acoustic guitar and/or acoustic guitar music tracks, such as music tracks that include John Pizzarelli on acoustic guitar, Michael Hedges on acoustic guitar, and the like.

In one or more implementations, the artist selection module 114 uses machine leaning techniques along with the joint acoustic-geometric feature vector generated by the cross-product module 110 to select music audio tracks that have the same or similar artists. For example, suppose a music audio track includes Jimi Hendrix playing guitar on the Star Spangled Banner. Based on the joint acoustic-geometric feature vector the artist selection module 114 selects other music tracks that include Jimi Hendrix. Alternatively, the artist selection module 114 selects music tracks that include artists similar to Jimi Hendrix, such as Dr. Know (a.k.a. Gary Miller), Slash (a.k.a. Saul Hudson), Lenny Kravitz, Prince, and the like.

As another example, suppose a music audio track includes Senegalese musical artist Youssou N'Dour. Based on the joint acoustic-geometric feature vector and using machine learning techniques the artist selection module 114 selects other music tracks that include Youssou N'Dour and/or other similar music tracks, such as music tracks that include Angelique Kidjo, Hugh Masekela, Miriam Makeba, and the like.

In one or more implementations, the mood selection module 116 uses machine learning techniques along with the joint acoustic-geometric feature vector generated by the cross-product module 110 to classify a mood, genre, etc., of a music audio track. For example, suppose a music audio track includes Julia Fordham singing in a bluesy manner. Based on the joint acoustic-geometric feature vector the mood selection module 116 selects other music tracks that include Julia Fordham. Alternatively, the mood selection module 116 selects music tracks that include bluesy music similar to Julia Fordham, such as Basia (a.k.a. Barbara Trzetrzelewska), Patty Austin, Etta James, and the like.

As another example, suppose a music audio track includes the U.S. Navy Band playing "Anchors Aweigh." Based on the joint acoustic-geometric feature vector and using machine learning techniques the artist selection module 114 selects other music tracks that include Anchors Aweigh and/or other similar marching band music tracks, such as music tracks that include the "Marines' Hymn," "Off We Go Into the Wild Blue Yonder" (a.k.a. "The Air Force Song"), and the like.

In one or more implementations, the generative music module 118 uses machine learning techniques and the joint acoustic-geometric feature vector generated by the cross-product module 110 to create music tracks that have unique melodies and rhythms. For example, suppose one music audio track includes a piano playing a melody, a second music audio track includes a bass line that accompanies the piano, a trumpet and a trombone playing harmony, and a talking drum that adds melody and rhythm to the music audio track. In this scenario, the generative music module 118 uses the piano timbre, the melody, the bass line, the trumpet and trombone timbres, the harmony, and talking drum timbre and rhythm to generate a unique music track. The music track may be one continuous track whose melodies, rhythms, timbres, etc., change as other music tracks are introduced into the music-analysis tool 100.

Example Acoustic Features Module 104

Figure 2:
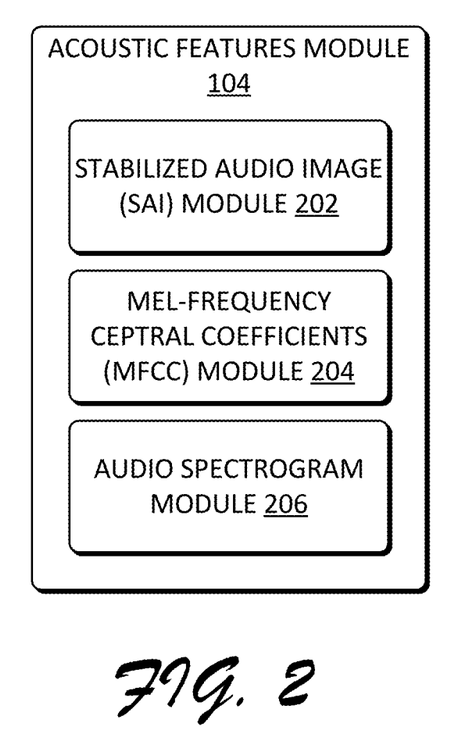
FIG. 2 illustrates an example acoustic features module according to one or more alternative implementations described herein.

FIG. 2 illustrates an example of the acoustic features module 104 according to one or more alternative implementations described herein. In one or more implementations, the acoustic features module 104 calculates acoustic features of the music audio track using an audio spectrogram of the music audio track. The audio spectrogram includes a set of clusters of interest points in the audio spectrogram. The audio spectrogram also includes a centroid for each cluster. The centroids form a code.

In the illustrated implementation, the acoustic features module 104 includes a Stabilized Audio Image (SAI) module 202, a mel-frequency cepstral coefficients (MFCC) module 204, and an audio spectrogram module 206.

In one or more implementations, the SAI module 202, the MFCC module 204, the audio spectrogram module 206, and/or other suitable acoustic feature extraction technique can be used alone or in any combination to calculate acoustic features for each music track and to aggregates and/or concatenates the acoustic features into a single acoustic feature vector for each music audio track. As described above, entities suitable for implementing the acoustic features module 104 include MATLAB® by The MathWorks, Inc., SciLab® by INRIA, Python®-based toolkits by Python Software Foundation (PSF), Music Analysis, Retrieval and Synthesis for Audio Signals (Marsyas) C++ software by developed by George Tzanetakis, and the like.

In one or more implementations, the SAI module 202 generates Stabilized Audio Images (SAIs) using mammalian auditory system models, such as cochlear filter banks as one or more inputs. The SAI is a two-dimensional representation of a music track that was obtained by the cochlear filter bank. The two-dimensional representation is a shifted concatenation of the one-dimensional representations that measure acoustic properties, where the shift is determined by correlation properties.

In one or more implementations, the mel-frequency cepstral coefficients (MFCC) module 204 generates mel-frequency cepstral coefficients for the music audio track obtained from the corpus 102. The MFCC is a representation of the power spectrum in the music audio track. In effect, the MFCC aims to approximate the response of the human ear to sounds included in the music audio track.

In one or more implementations, the audio spectrogram module 206 generates an audio spectrogram for the music audio tracks obtained from the corpus. For example, the audio spectrogram module 206 performs a Fourier transform on the audio signal in the music audio track. The resulting audio spectrogram includes a graph showing peaks of particular frequencies in the audio signal. The peaks in the audio spectrogram may correspond to a rhythm, timbre, etc., in the music audio track.

Example Vector Quantization Module 106

Figure 3:
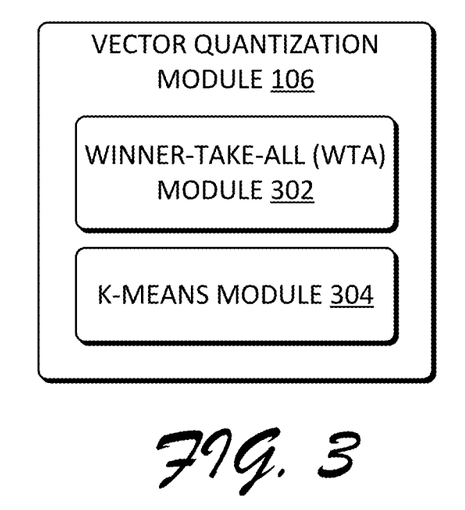
FIG. 3 illustrates an example vector quantization module according to one or more alternative implementations described herein.

FIG. 3 illustrates an example of the vector quantization module 106 according to one or more alternative implementations described herein. In the illustrated example, the vector quantization module 106 includes a winner-take-all module 302 and a k-means module 304.

In one or more implementations, the winner-take-all (WTA) module 302 applies a WTA algorithm to the acoustic features calculated by the acoustic features module 104 to find clusters of data points in the acoustic features. In one example implementation, the winner-take-all (WTA) module 302 is used to find clusters of points of interest around beginning of a musical note in the music audio track. In other example implementations, the winner-take-all (WTA) module 302 finds clusters of points of interest in the auto-correlation information representing a relationship between clusters of data points.

In one or more implementations, the k-means module 304 vector quantizes calculates k-means for the geometric features calculated by the geometric features module 108 to find clusters of data points in the geometric features. In one example implementation, a k-means algorithm is used to find clusters of points of interest around beginning of a musical note in the music audio track. In other example implementations, the k-means algorithm finds clusters of points of interest in the auto-correlation information representing a relationship between clusters of data points.

Example Geometric Features Module 108

Figure 4:
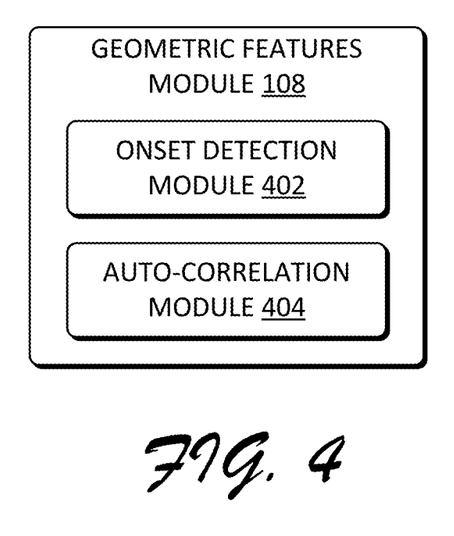
FIG. 4 illustrates an example geometric features module according to one or more alternative implementations described herein.

FIG. 4 illustrates an example of the geometric features module 108 according to one or more alternative implementations described herein. In one or more implementations, the geometric features module 108 calculates geometric features, regional features, and/or long timescale features of each music audio track. The illustrated geometric features module 108 includes an onset detection module 402 and an auto-correlation module 404.

In one or more implementations, the onset detection module 402 detects the onset of musical notes in each music audio track. Example implementations utilize spectral flux techniques, complex domain techniques, and/or phase deviation techniques to detect the onset of musical notes in the music audio track.

In one or more implementations, the auto-correlation module 404 determines a correlation between two or more clusters of points of interest for each music audio track. That is, the auto-correlation module 404 determines where patterns in the music audio track repeat. Determining the correlation between two or more clusters of points of interest for each music audio track (or geometric reasoning) may be done recursively so that the result is a content-agnostic representation of the music audio track that is robust to noise and the audio signal in the music audio track.

Example Cross-Product Module 110

Figure 5:
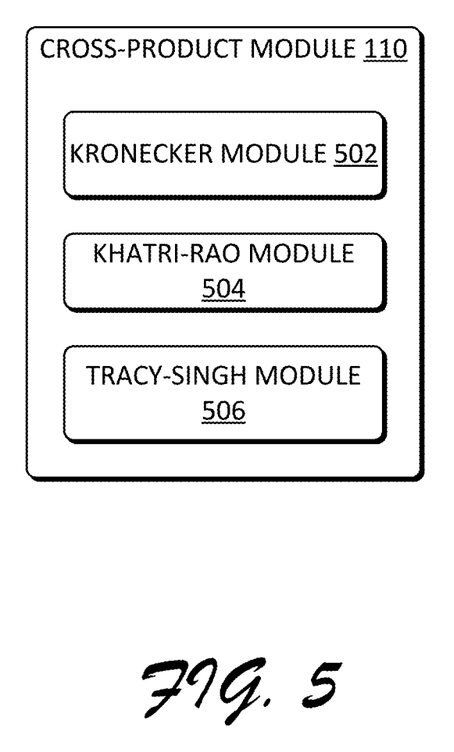
FIG. 5 illustrates an example cross-product module according to one or more alternative implementations described herein.

FIG. 5 illustrates an example of the cross-product module 110 according to one or more alternative implementations described herein. The example cross-product module 110 takes a cross-product of the vector-quantized acoustic, local, and/or short timescale features and the vector-quantized and the geometric features, regional features, and/or long timescale features. The illustrated cross-product module includes a Kronecker module 502, a Khatri-Rao module 504, and a Tracy-Singh module 506.

In one or more implementations, the Kronecker module 502 takes a cross-product of the vector-quantized acoustic features and the vector quantized geometric features. The Kronecker product is defined as follows. Suppose A is an m-by-n matrix and B is a p-by-q matrix. The Kronecker product or direct matrix product is A⊗B having an mp-by-nq block matrix.

In one or more implementations, the Khatri-Rao module 504 also takes a cross-product of the vector-quantized acoustic features and the vector quantized geometric features. The Khatri-Rao product is defined as follows. Suppose A is an m-by-n matrix and B is a p-by-q matrix. The m-by-n matrix is partitioned into the $m_i$-by-$n_j$ blocks $A_{ij}$ and the p-by-q matrix is partitioned into the $p_k$-by-$q_l$ blocks $B_{kl}$. The Khatri-Rao product is $(A_{ij} \otimes B)_{ij}$.

In one or more implementations described herein, the Khatri-Rao module 504 utilizes both the MFCC codebook and the SAI codebook for the vector-quantized acoustic features along with the winner-take-all (WTA) codebook and the k-means codebook for the vector-quantized geometric features. The Khatri-Rao module 504 computes a cross-product of (MFCC codebook and SAI codebook) and (WTA codebook and k-means codebook).

In one or more implementations, the Tracy-Singh module 506 takes a cross-product of the vector-quantized acoustic features and the vector quantized geometric features. The Tracy-Singh product is defined as follows. Suppose A is an m-by-n matrix and B is a p-by-q matrix. The m-by-n matrix is partitioned into the $m_i$-by-$n_j$ blocks $A_{ij}$ and the p-by-q matrix is partitioned into the $p_k$-by-$q_l$ blocks $B_{kl}$. The Khatri-Rao product is $((A_{ij} \otimes B)_{kl})_{ij}$.

Figure 6:
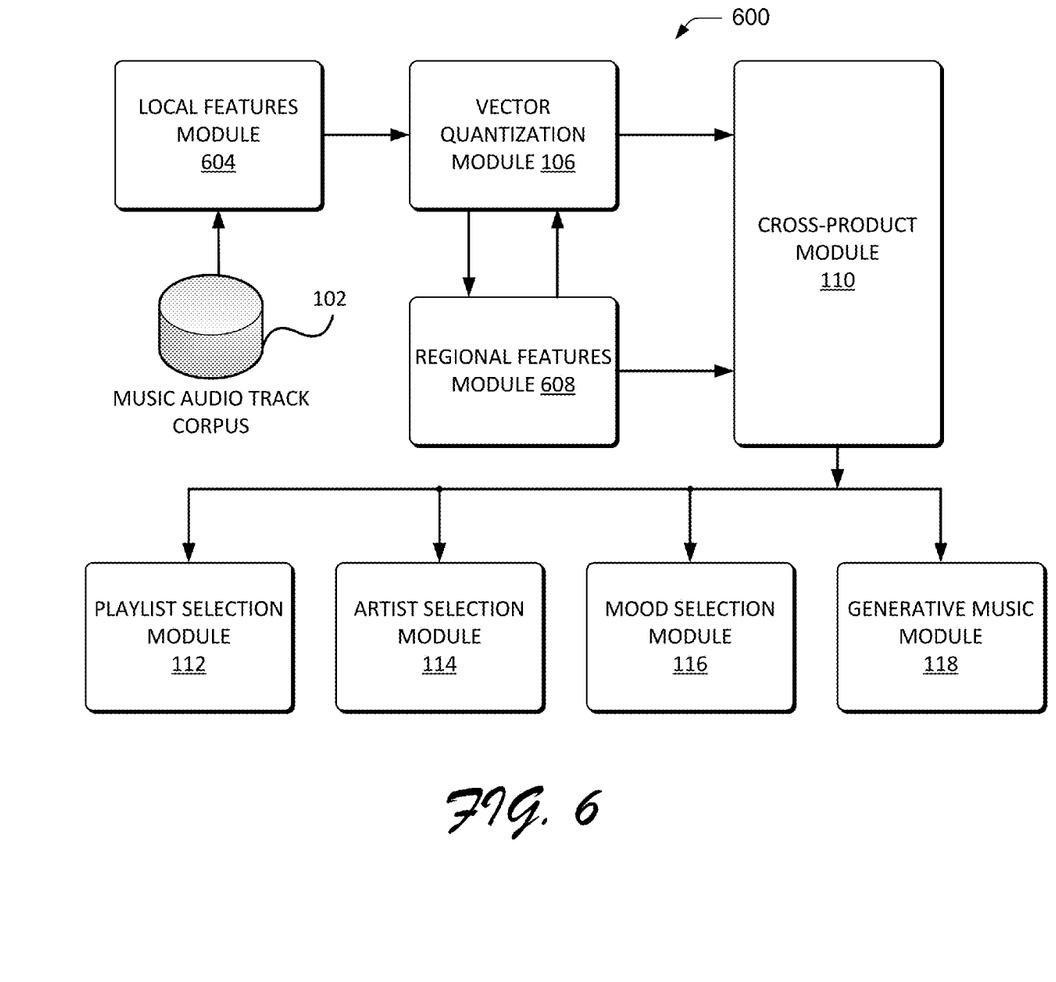
FIG. 6 and FIG. 7 illustrate example music-analysis tools according to one or more alternative implementations described herein.

Example Alternative Music-Analysis Tool Using Local and Regional Joint Learning FIG. 6 illustrates an example music-analysis tool 600 according to one or more alternative implementations described herein. In the illustrated implementation, the music-analysis tool 600 includes the music audio track corpus 102, a local features module 604, the vector quantization module 106, a geometric features module 608, and the cross-product module 110. The illustrated music-analysis tool 600 also includes the playlist selection module 112, the artist selection module 114, the mood selection module 116, and the generative music module 118 the music audio track corpus 102, a local features module 604, the vector quantization module 106, a geometric features module 608, and the cross-product module 110. The illustrated music-analysis tool 600 also includes the playlist selection module 112, the artist selection module 114, the mood selection module 116, and the generative music module 118.

In one or more implementations, the local features module 604 calculates local features of the music audio track for each music track obtained from the corpus 102. The local features module 604 aggregates and/or concatenates the local features into a single local feature vector for each music audio track. For each music track the local features module 604 utilizes an audio spectrogram, a Stabilized Auditory Image (SAI), and/or mel-frequency cepstrum coefficients (MFCCs) to calculate the local features of the music audio track.

In one or more implementations, the music audio track corpus 102, the vector quantization module 106, the cross-product module 110, the playlist selection module 112, the artist selection module 114, the mood selection module 116, and the generative music module 118 perform the same or similar functions as described previously. The music audio track corpus 102 includes the music audio tracks, the vector quantization module 106 vector quantizes the local features and the regional features, and the cross-product module 110 takes the cross-product of the vector-quantized local features and the vector-quantized regional features.

Figure 7:
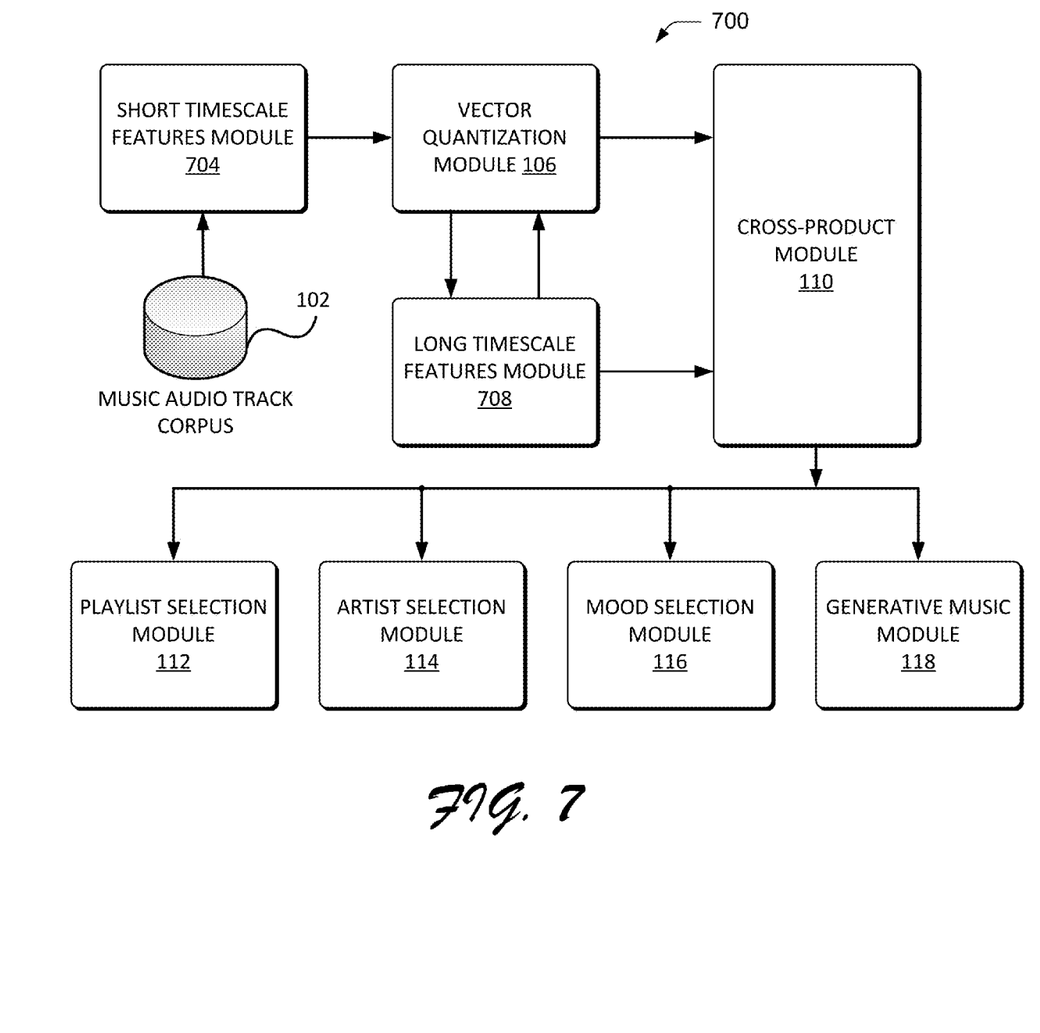

Example Alternative Music-Analysis Tool Using Short and Long Timescale Joint Learning FIG. 7 illustrates an example music-analysis tool 700 according to one or more alternative implementations described herein. In the illustrated implementation, the music-analysis tool 700 includes the music audio track corpus 102, a short timescale features module 704, the vector quantization module 106, a long timescale features module 708, and the cross-product module 110. The illustrated music-analysis tool 700 also includes the playlist selection module 112, the artist selection module 114, the mood selection module 116, and the generative music module 118 the music audio track corpus 102, a short timescale features module 704, the vector quantization module 106, a long timescale features module 708, and the cross-product module 110. The illustrated music-analysis tool 700 also includes the playlist selection module 112, the artist selection module 114, the mood selection module 116, and the generative music module 118.

In one or more implementations, the short timescale features module 704 calculates short timescale features of the music audio track for each music track obtained from the corpus 102. The short timescale features module 704 aggregates and/or concatenates the local features into a single local feature vector for each music audio track. For each music track the short timescale features module 704 utilizes an audio spectrogram, a Stabilized Auditory Image (SAI), and/or mel-frequency cepstrum coefficients (MFCCs) to calculate the local features of the music audio track.

In one or more implementations, the music audio track corpus 102, the vector quantization module 106, the cross-product module 110, the playlist selection module 112, the artist selection module 114, the mood selection module 116, and the generative music module 118 perform the same or similar functions as described previously. The music audio track corpus 102 includes the music audio tracks, the vector quantization module 106 vector quantizes the short timescale features and the long timescale features, and the cross-product module 110 takes the cross-product of the vector-quantized short timescale features and the vector-quantized long timescale features.

Example Music-Analysis Tool Operation

Figure 8:
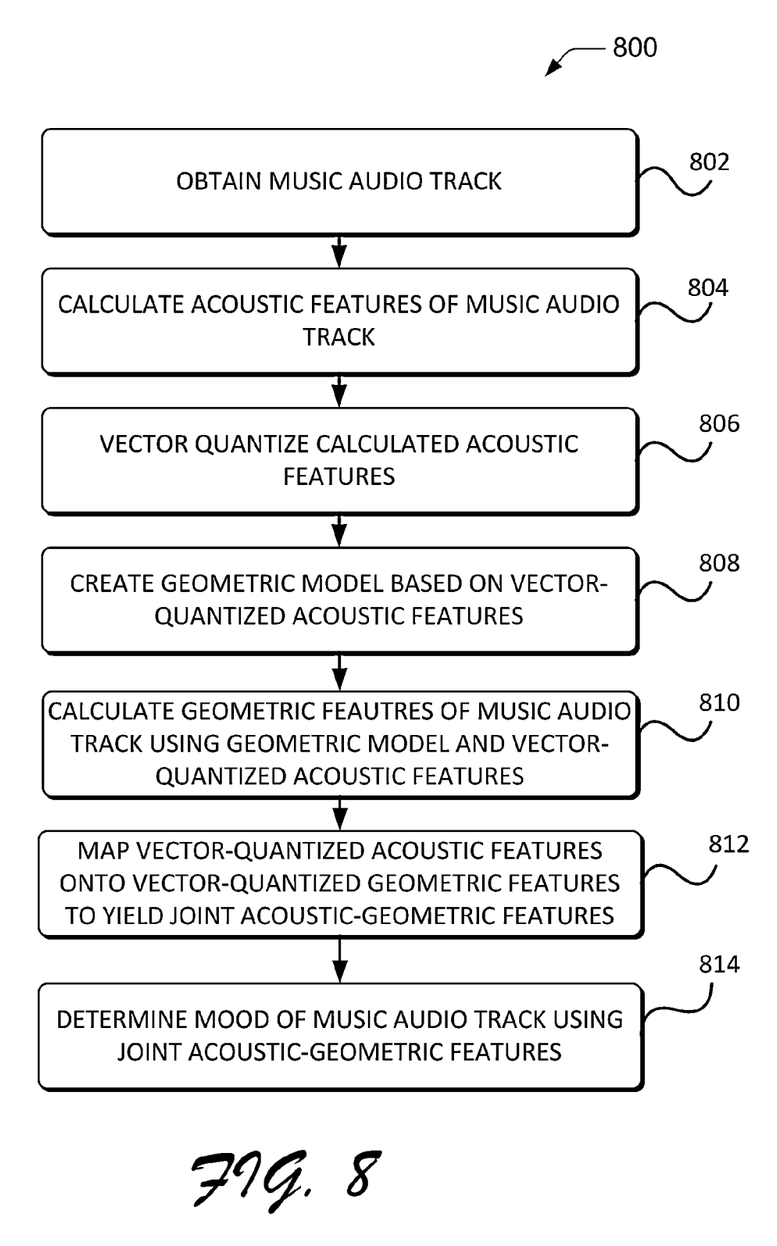
FIG. 8 is a flowchart of a method illustrating an example of how the music-analysis tools illustrated in FIG. 1, FIG. 6, and/or FIG. 7 operate according to one or more implementations described herein.

FIG. 8 is a flowchart of a method 800 illustrating an example of how a music-analysis tool operates according to one or more implementations described herein.

In a block 802, the method 800 obtains a music audio track. In one or more implementations, the acoustic features module 104 obtains one or more music audio track from the corpus 102.

In a block 804, the method 800 calculates acoustic features of the music audio track. In one or more implementations, the acoustic features module 104 calculates acoustic features of the music audio track for each music track obtained from the corpus 102.

In a block 806, the method 800 vector quantizes the calculated acoustic features. In one or more implementations, the vector quantization module 106 vector quantizes the acoustic features calculated by the acoustic features module 104.

In a block 808, the method 800 creates a geometric model based on the vector-quantized acoustic features. In one or more implementations, machine learning techniques such as classification, ranking, prediction, and/or the like along with the vector-quantized acoustic features are used to obtain an acoustical representation of the music audio track.

In a block 810, the method 800 calculates geometric features of the music audio track using the geometric model and vector-quantized acoustic features. In one or more implementations, the geometric features module 108 calculates geometric features of the music audio track.

In a block 812, the method 800 maps the vector-quantized acoustic features onto the vector-quantized geometric features to yield joint acoustic-geometric features. In one or more implementations, the cross-product module 110 maps the vector-quantized acoustic features onto the vector-quantized geometric features to yield joint acoustic-geometric features.

In a block 814, the method 800 determines a mood of a music audio track using the joint acoustic-geometric features. In one or more implementations, the mood selection module 116 determines a mood of a music audio track using the joint acoustic-geometric features.

Alternative Example Music-Analysis Tool Operation

Figure 9:
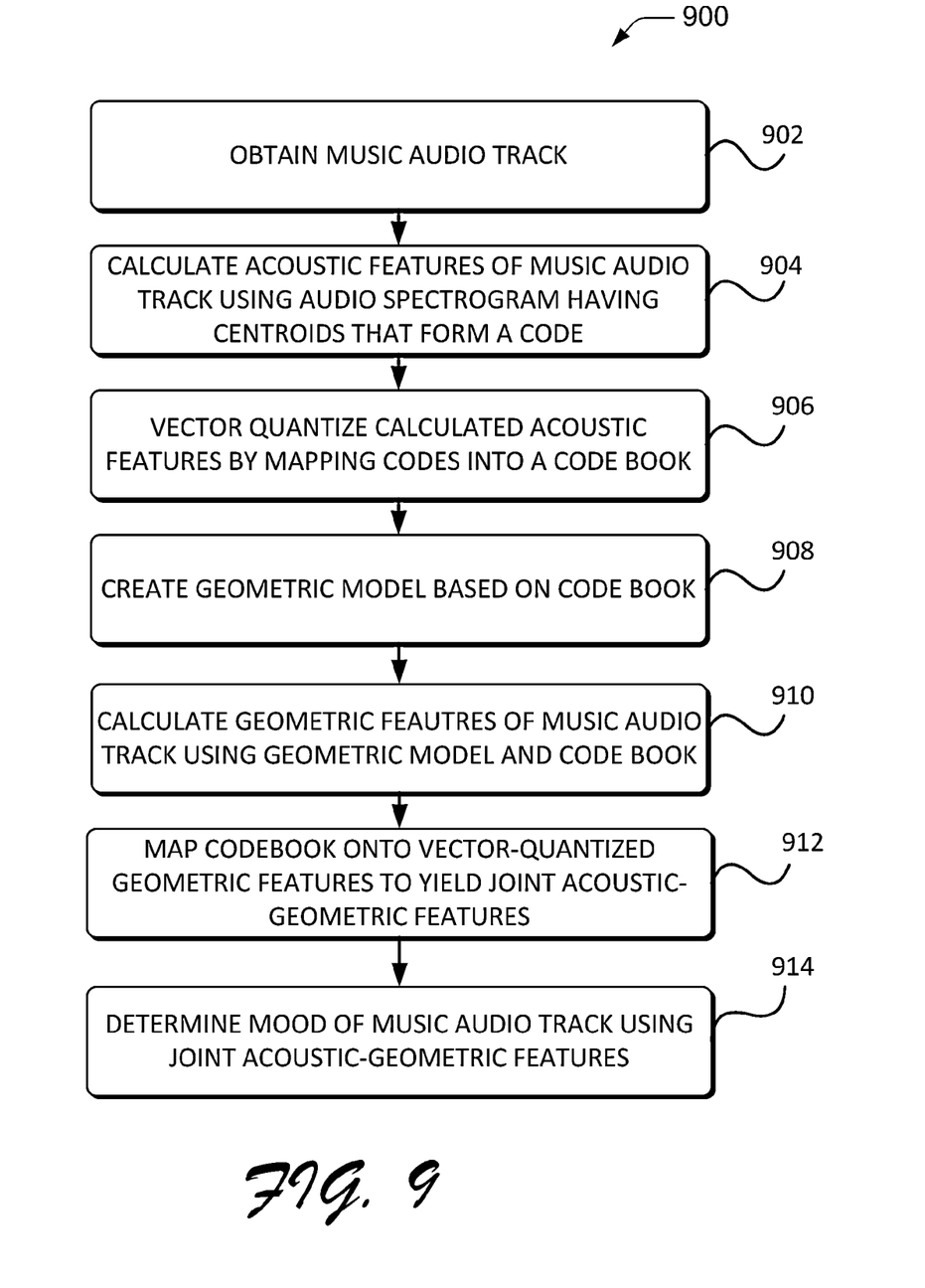
FIG. 9 is a flowchart of a method illustrating an example of how the music-analysis tools illustrated in FIG. 1, FIG. 6, and/or FIG. 7 operate according to one or more alternative implementations described herein.

FIG. 9 is a flowchart of a method 900 illustrating an example of how a music-analysis tool operates according to one or more implementations described herein.

In a block 902, the method 900 obtains a music audio track. In one or more implementations, the acoustic features module 104 obtains one or more music audio track from the corpus 102.

In a block 904, the method 900 calculates acoustic features of the music audio track using an audio spectrogram. The audio spectrogram includes centroids that form a code. In one or more implementations, the acoustic features module 104 calculates acoustic features of the music audio track for each music track obtained from the corpus 102.

In a block 906, the method 900 vector quantizes the calculated acoustic features by mapping the codes in the audio spectrogram into a code book. In one or more implementations, the vector quantization module 106 vector quantizes the acoustic features calculated by the acoustic features module 104 and maps the codes in the audio spectrogram into a code book.

In a block 908, the method 900 creates a geometric model based on the codebook. In one or more implementations, machine learning techniques such as classification, ranking, prediction, and/or the like along with the vector-quantized acoustic features are used to create geometric model based on the codebook.

In a block 910, the method 900 calculates geometric features of the music audio track using the geometric model and the codebook. In one or more implementations, the geometric features module 108 calculates geometric features of the music audio track using the geometric model and the codebook.

In a block 912, the method 900 maps the codebook onto the vector-quantized geometric features to yield joint acoustic-geometric features. In one or more implementations, the cross-product module 110 maps the codebook onto the vector-quantized geometric features to yield joint acoustic-geometric features.

In a block 914, the method 900 determines a mood of a music audio track using the joint acoustic-geometric features. In one or more implementations, the mood selection module 116 determines a mood of a music audio track using the joint acoustic-geometric features.

Alternative Example Music-Analysis Tool Operation

Figure 10:
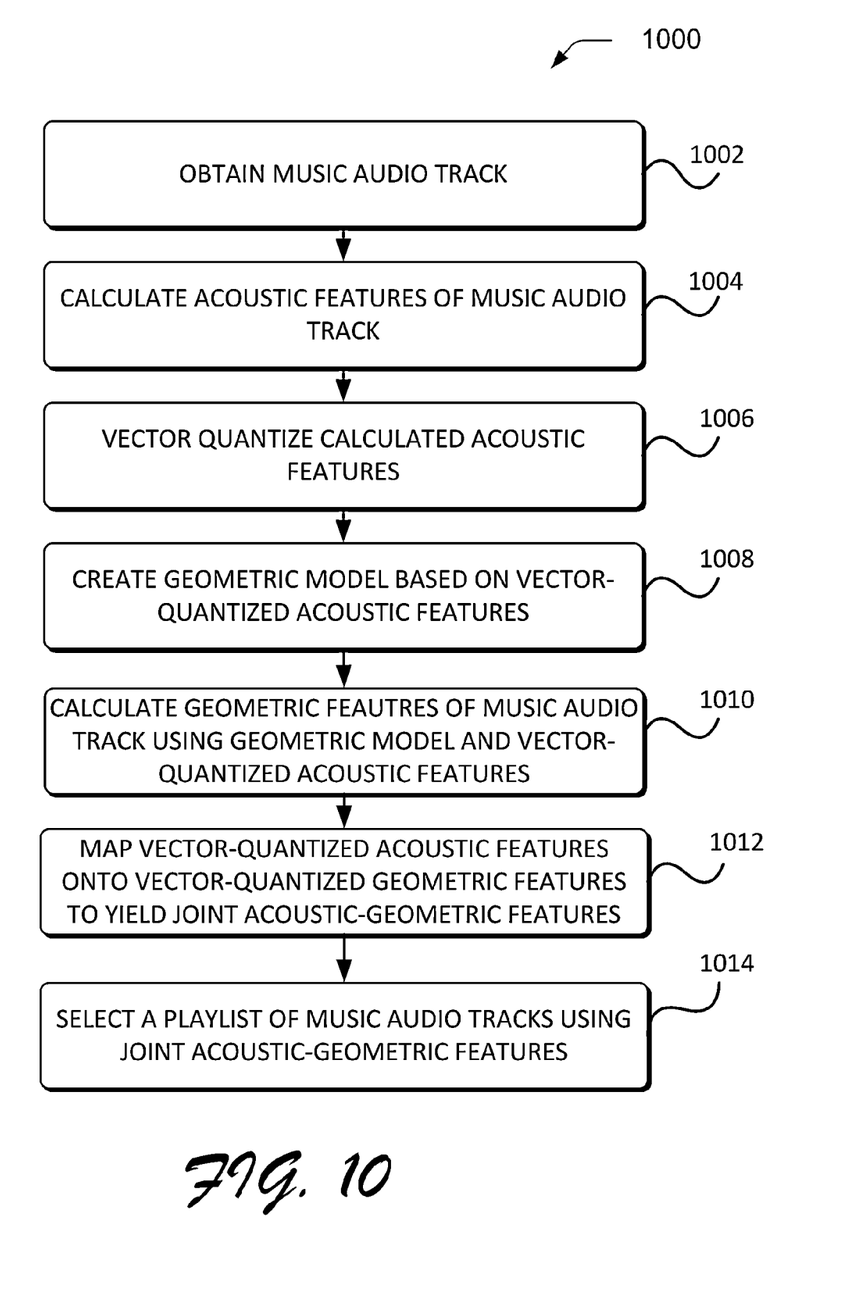
FIG. 10 is a flowchart of a method illustrating an example of how the music-analysis tools illustrated in FIG. 1, FIG. 6, and/or FIG. 7 operate according to one or more alternative implementations described herein.

FIG. 10 is a flowchart of a method 1000 illustrating an example of how a music-analysis tool operates according to one or more implementations described herein.

In a block 1002, the method 1000 obtains a music audio track. In one or more implementations, the acoustic features module 104 obtains one or more music audio track from the corpus 102.

In a block 1004, the method 1000 calculates acoustic features of the music audio track. In one or more implementations, the acoustic features module 104 calculates acoustic features of the music audio track for each music track obtained from the corpus 102.

In a block 1006, the method 1000 vector quantizes the calculated acoustic features. In one or more implementations, the vector quantization module 106 vector quantizes the acoustic features calculated by the acoustic features module 104.

In a block 1008, the method 1000 creates a geometric model based on the vector-quantized acoustic features. In one or more implementations, machine learning techniques such as classification, ranking, prediction, and/or the like along with the vector-quantized acoustic features are used to obtain an acoustical representation of the music audio track.

In a block 1010, the method 1000 calculates geometric features of the music audio track using the geometric model and vector-quantized acoustic features. In one or more implementations, the geometric features module 108 calculates geometric features of the music audio track.

In a block 1012, the method 1000 maps the vector-quantized acoustic features onto the vector-quantized geometric features to yield joint acoustic-geometric features. In one or more implementations, the cross-product module 110 maps the vector-quantized acoustic features onto the vector-quantized geometric features to yield joint acoustic-geometric features.

In a block 1014, the method 1000 selects a playlist of one or more music audio tracks using the joint acoustic-geometric features and machine learning. In one or more implementations, the mood selection module 116 determines a mood of a music audio track using the joint acoustic-geometric features and machine learning.

Example Computing Environment

Figure 11:
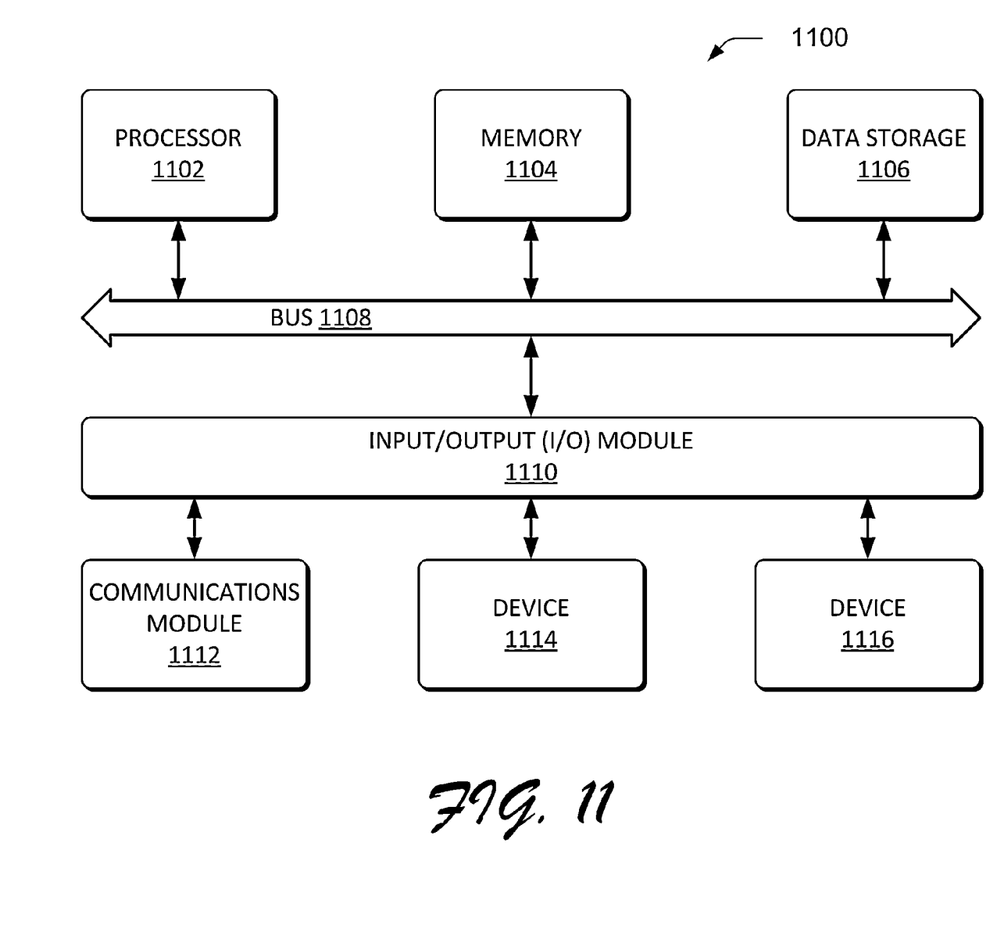
FIG. 11 is a high-level block diagram illustrating an example computer system suitable for implementing the technology described herein.

FIG. 11 is a high-level block diagram illustrating an example computer system 1100 suitable for implementing the music-analysis tool 100 of FIG. 1, the music-analysis tool 600 of FIG. 6, and/or the music-analysis tool 700 of FIG. 7. In certain aspects, the computer system 1100 may be implemented using hardware or a combination of software and hardware.

The illustrated computer system 1100 includes a processor 1102, a memory 1104, and data storage 1106 coupled to a bus 1108 or other communication mechanism for communicating information. An input/output (I/O) module 1110 is also coupled to the bus 1108. A communications module 1112, a device 1114, and a device 1116 are coupled to the I/O module 1110.

The processor 1102 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information. The processor 1102 may be used for processing information. The processor 1102 can be supplemented by, or incorporated in, special purpose logic circuitry.

The memory 1104 may be Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device used for storing information, a computer program, and/or instructions to be executed by the processor 1102. They memory 1104 may store code that creates an execution environment for one or more computer programs used to implement technology described herein.

A computer program as discussed herein does not necessarily correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

Unless indicated otherwise by the context, a module refers to a component that is hardware, firmware, and/or a combination thereof with software (e.g., a computer program.) A computer program as discussed herein does not necessarily correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The instructions may be implemented in one or more computer program products, i.e., one or more modules of computer program instructions encoded on one or more computer readable media for execution by, or to control the operation of, the computer system 1100, and according to any method well known to those of skill in the art. The term "computer-readable media" includes computer-storage media. For example, computer-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM))

The data storage 1106 may be a magnetic disk or optical disk, for example. The data storage 1106 may function to store information and instructions to be used by the processor 1102 and other components in the computer system 1100.

The bus 1108 may be any suitable mechanism that allows information to be exchanged between components coupled to the bus 1108. For example, the bus 1108 may be transmission media such as coaxial cables, copper wire, and fiber optics, optical signals, and the like.

The I/O module 1110 can be any input/output module. Example input/output modules 1110 include data ports such as Universal Serial Bus (USB) ports.

The communications module 1112 may include networking interface cards, such as Ethernet cards and modems.

The device 1114 may be an input device. Example devices 1114 include a keyboard, a pointing device, a mouse, or a trackball, by which a user can provide input to the computer system 1100.

The device 1116 may be an output device. Example devices 1116 include displays such as cathode ray tubes (CRT) or liquid crystal display (LCD) monitors that display information, such as webpages, for example, to the user.

One or more implementations are described herein with reference to illustrations for particular applications. It should be understood that the implementations are not intended to be limiting. Those skilled in the art with access to the teachings provided herein will recognize additional modifications, applications, and implementations within the scope thereof and additional fields in which the technology would be of significant utility. In the above description of example implementations, for purposes of explanation, specific numbers, materials, configurations, and other details are set forth in order to better explain implementations as claimed. However, it will be apparent to one skilled in the art that the claims may be practiced using details different than the examples described herein. In other instances, well-known features are omitted or simplified to clarify the description of the example implementations.

For example, it will be appreciated that several of the above-disclosed and other features and functions, or alternatives thereof, may be combined into many other different systems or applications. Also, it will be appreciated that various presently unforeseen or unanticipated alternatives, modifications, variations or improvements therein may be subsequently made by those skilled in the art, which are also intended to be encompassed by the claims that follow.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

What is claimed is:

1. A music-analysis tool comprising:
   a music audio track selection module that is configured to select at least one music audio track from a corpus of music audio tracks;
   an acoustic-features module that is configured to calculate acoustic features of the music audio track;
   a vector-quantization module that is configured to vector quantize the calculated acoustic features;
   a geometric-features module that is configured to calculate geometric features of the music audio track based on the vector-quantized acoustic features, wherein the vector-quantization module is further configured to vector quantize the calculated geometric features;
   a cross-product module that is configured to take a cross-product of the vector-quantized acoustic features and the vector-quantized geometric features to yield a joint acoustic-geometric feature vector for the music audio track; and
   a playlist-selection module that is configured to select a playlist of music audio based on the joint acoustic-geometric feature vector for the music audio track.

2. A music-analysis tool according to claim 1 wherein the acoustic-features module includes at least one of an audio spectrogram, a Stabilized Auditory Image (SAI) and Mel-frequency cepstrum coefficients (MFCCs).

3. A music-analysis tool according to claim 1 wherein the vector-quantization module includes at least one of a winner-take-all module and a K-means module.

4. A music-analysis tool according to claim 1 wherein the geometric-features module includes at least one of an onset detection module and an auto-correlation module.

5. A music-analysis tool according to claim 1 wherein the cross-product module includes at least one of a Kronecker product module, a Khatri-Rao product module, and a Tracy-Singh product module.

6. A music-analysis tool according to claim 1 wherein the acoustic features include features related to a type of instrument in the music audio track.

7. A music-analysis tool according to claim 1 wherein the geometric features include features related to a melody in the music audio track.

8. A music-analysis tool comprising:
a music audio track selection module that is configured to select at least one music audio track from a corpus of music audio tracks;
a Mel-frequency cepstrum coefficients (MFCCs) module that is configured to calculate the MFCCs from local features of the music audio track;
a k-means module that is configured to calculate k-means for the calculated MFCCs;
a regional-features module that is configured to calculate regional features of the music audio track based on the calculated k-means, wherein the k-means module is further configured to calculate the k-means of the calculated regional features;
a cross-product module that is configured to take a cross-product of the k-means of the calculated MFCCs and the k-means of the calculated regional features to yield a joint local-regional feature vector for the music audio track; and
an artist-selection module that is configured to select a music artist based on the joint local-regional feature vector for the music audio track.

9. A music-analysis tool according to claim 8 wherein the regional-features module includes at least one of an onset detection module and an auto-correlation module.

10. A music-analysis tool according to claim 8 wherein the cross-product module includes at least one of a Kronecker product module, a Khatri-Rao product module, and a Tracy-Singh product module.

11. A music-analysis tool comprising:
a music audio track selection module that is configured to select at least one music audio track from a corpus of music audio tracks;
a Stabilized Auditory Image (SAI) module that is configured to calculate short timescale features of the music audio track;
a winner-take-all (WTA) module that is configured to vector quantize the calculated short timescale features;
a long-timescale-features module that is configured to calculate long timescale features of the music audio track based on the vector-quantized short timescale features, wherein the WTA module is further configured to vector quantize the calculated long timescale features;
a cross-product module that is configured to take a cross-product of the vector-quantized short timescale features and the vector-quantized long timescale features to yield a joint short timescale-long timescale feature vector for the music audio track; and
a mood-selection module that is configured to determine a mood of the music audio track based on the joint short timescale-long timescale feature vector for the music audio track.

12. A music-analysis tool according to claim 11 wherein the long-timescale-model module includes at least one of an onset detection module and an auto-correlation module.

13. A music-analysis tool according to claim 11 wherein the cross-product module includes at least one of a Kronecker product module, a Khatri-Rao product module, and a Tracy-Singh product module.

14. A music-analysis tool according to claim 11 wherein the short timescale features include features related to a type of instrument in the music audio track.

15. A music-analysis tool according to claim 11 wherein the long timescale features include features related to a melody in the music audio track.

16. A method comprising:
obtaining a music audio track;
calculating acoustic features of the music audio track;
vector quantizing the calculated acoustic features;
creating a geometric model based on the vector-quantized acoustic features;
using the geometric model and based on the vector-quantized acoustic features, calculating geometric features of the music audio track;
mapping the vector-quantized acoustic features onto vector-quantized geometric features to yield joint acoustic-geometric features; and
using the joint acoustic-geometric features, determining a mood of the music audio track.

17. A method according to claim 16 wherein the acoustic features include features related to a type of musical instrument in the music audio track.

18. A method according to claim 16 wherein the geometric features include features related to a type of rhythm in the music audio track.

19. A method according to claim 16 wherein mapping the vector-quantized acoustic features onto the vector-quantized geometric features includes taking at least one of a Kronecker cross-product, a Khatri-Rao cross-product, and a Tracy-Singh cross-product of the vector-quantized acoustic features and the vector-quantized geometric features.

20. A method according to claim 16 wherein the acoustic-features module includes at least one of an audio spectrogram, a Stabilized Auditory Image (SAI) and Mel-frequency cepstrum coefficients (MFCCs).

21. A method according to claim 16 wherein vector quantizing the calculated acoustic features includes applying a winner-take-all hash function to the calculated acoustic features.

22. A method according to claim 16 wherein vector quantizing the calculated acoustic features includes applying a k-means clustering function to the calculated acoustic features.

23. A method according to claim 16 wherein vector-quantizing the geometric features of the music audio track includes auto-correlating the geometric features of the music audio track with each other.

24. A method according to claim 16 wherein vector-quantizing the geometric features of the music audio track includes detecting a beginning of at least one musical note in the music audio track.

25. One or more computer-readable media storing processor-executable instructions that when executed cause one or more processors to perform a method comprising:
obtaining a music audio track;

calculating acoustic features of the music audio track using an audio spectrogram of the music audio track, wherein the audio spectrogram includes a set of clusters of interest points in the audio spectrogram, wherein the audio spectrogram further includes a centroid for each cluster, wherein the centroids form a code;

vector quantizing the calculated acoustic features by mapping the codes into a code book;

creating a geometric model based on the code book;

using the geometric model and based on the code book, calculating geometric features of the music audio track;

mapping the codebook onto the vector-quantized geometric features to yield joint acoustic-geometric features; and using the joint acoustic-geometric features, determining a mood of the music audio track.

26. One or more computer-readable media according to claim 25 wherein calculating the acoustic features of the music audio track using an audio spectrogram of the music audio track includes detecting peaks in the set of clusters of interest points, wherein the peaks in the audio spectrogram represent rhythm components underlying the acoustic features of the music audio track.

27. One or more computer-readable media according to claim 25 wherein mapping the code book onto the vector-quantized geometric features to yield joint acoustic-geometric features includes mapping features related to a melody in the music audio track to features related to a rhythm in the music audio track.

28. One or more computer-readable media according to claim 25 wherein mapping the codebook onto the vector-quantized geometric features to yield joint acoustic-geometric features includes taking at least one of a Kronecker cross-product, a Khatri-Rao cross-product, and a Tracy-Singh cross-product of the code book and the vector-quantized geometric features.

29. One or more computer-readable media according to claim 25 wherein vector quantizing the calculated acoustic features includes applying a winner-take-all hash function to the calculated acoustic features.

30. One or more computer-readable media according to claim 25 wherein mapping the codebook onto the vector-quantized geometric features includes applying a k-means clustering function to the calculated acoustic features.

31. One or more computer-readable media according to claim 25 wherein mapping the codebook onto the vector-quantized geometric features includes auto-correlating the geometric features of the music audio track with each other.

32. One or more computer-readable media according to claim 25 wherein mapping the codebook onto the vector-quantized geometric features includes detecting a beginning of at least one musical note in the music audio track.

33. One or more computer-readable media storing processor-executable instructions that when executed cause one or more processors to perform a method comprising:

obtaining a music audio track;

calculating acoustic features of the music audio track;

vector quantizing the calculated acoustic features;

creating a geometric model based on the vector-quantized acoustic features;

using the geometric model, vector-quantizing geometric features of the music audio track;

mapping the vector-quantized acoustic features onto the vector-quantized geometric features to yield joint acoustic-geometric features; and using the joint acoustic-geometric features, select a playlist of music audio tracks based on the joint acoustic-geometric feature vector for the music audio track.

34. One or more computer-readable media according to claim 33 wherein the joint acoustic-geometric features represent how the pitch and timber in the music audio track relate to each other in time.

35. One or more computer-readable media according to claim 33 wherein the joint acoustic-geometric features represent at least one of an emotion, a meaning, and mood of the music audio track.

36. A music-analysis system comprising:

a music-analysis tool having:

a music audio track selection module that is configured to select at least one music audio track from a corpus of music audio tracks;

an acoustic-features module that is configured to calculate acoustic features of the obtained music audio track;

a vector-quantization module that is configured to vector quantize the calculated acoustic features;

a geometric-features module that is configured to calculate geometric features of the obtained music audio track based on the vector-quantized acoustic features, wherein the vector-quantization module is further configured to vector quantize the calculated geometric features; and a cross-product module that is configured to take a cross-product of the vector-quantized acoustic features and the vector-quantized geometric features to yield a joint acoustic-geometric feature vector for the obtained music audio track; and a generative-music module that is configured to compose a music audio track that is different from the obtained music audio track using the joint-acoustic-geometric feature vector for the obtained music audio track.

37. A music-analysis system according to claim 36 further comprising a playlist-selection module that is configured to select a playlist of music audio based on the joint acoustic-geometric feature vector for the obtained music audio track.

38. A music-analysis system according to claim 36 further comprising an artist-selection module that is configured to select a music artist based on the joint local-regional feature vector for the obtained music audio track.

39. A music-analysis system according to claim 36 wherein the calculated acoustic features include at least one point of interest, wherein the vector-quantization module is further configured to detect the points of interest in the calculated acoustic features and to vector-quantize the detected points of interest in the calculated acoustic features.

* * * * *